(12) United States Patent
Acimas et al.

(10) Patent No.: US 9,402,348 B2
(45) Date of Patent: Aug. 2, 2016

(54) BALING PRESS WITH A ROPE TYING SYSTEM AND METHOD OF SUPPLYING ROPE TO A KNOTTER OF A BALING PRESS

(71) Applicant: BOLLEGRAAF PATENTS AND BRANDS B.V., AM Appingedam (NL)

(72) Inventors: Andreas Acimas, Solingen (NL); Christian Steglich, Freren (NL)

(73) Assignee: BOLLEGRAAF PATENTS AND BRANDS B.V., Appingedam (NL)

( * ) Notice: Subject to any disclaimer, the term of this patent is extended or adjusted under 35 U.S.C. 154(b) by 0 days.

(21) Appl. No.: 14/703,104

(22) Filed: May 4, 2015

(65) Prior Publication Data

US 2015/0313087 A1    Nov. 5, 2015

(30) Foreign Application Priority Data

May 5, 2014  (EP) .................................... 14167060

(51) Int. Cl.
| | |
|---|---|
| *A01F 15/14* | (2006.01) |
| *A01F 15/04* | (2006.01) |
| *B65B 13/26* | (2006.01) |
| *B65B 27/12* | (2006.01) |
| *A01D 59/04* | (2006.01) |
| *A01F 15/12* | (2006.01) |
| *B65B 13/18* | (2006.01) |

(52) U.S. Cl.
CPC .............. *A01F 15/145* (2013.01); *A01D 59/04* (2013.01); *A01F 15/04* (2013.01); *A01F 15/12* (2013.01); *B65B 13/18* (2013.01); *B65B 13/26* (2013.01); *B65B 27/12* (2013.01)

(58) Field of Classification Search
CPC ....... A01F 15/04; A01F 15/14; A01F 15/145; A01F 15/12; A01D 59/04; B65B 13/26; B65B 27/12; B65B 13/18
USPC ........... 100/3, 6, 11, 17, 20, 19 R, 21, 24, 31, 100/33 R; 140/30, 93.6, 102, 118, 119, 149
See application file for complete search history.

(56) References Cited

U.S. PATENT DOCUMENTS

| | | | |
|---|---|---|---|
| 208,137 A | 9/1878 | Appleby | |
| 591,614 A | 10/1897 | Appleby | |
| 744,153 A | 11/1903 | Appleby | |
| 2,853,000 A * | 9/1958 | Russell ................... | A01F 15/14 100/19 A |

(Continued)

FOREIGN PATENT DOCUMENTS

| | | |
|---|---|---|
| DE | 27 59 976 C1 | 7/1982 |
| EP | 1 190 618 A1 | 3/2002 |

(Continued)

*Primary Examiner* — Jimmy T Nguyen
(74) *Attorney, Agent, or Firm* — Pearne & Gordon LLP

(57) ABSTRACT

A baling press has feeding structures for feeding rope materials along opposite first and second sides of the pressing channel and one or more knotters on a first side of the pressing channel. Each knotter includes a knot tier for knotting sections of the rope materials in a knotting area to each other, a cutter and a rope holder for holding rope material cut off from the knotted rope sections. The knotting area is closer to the bale pressing channel than the rope holder. A loop supply member is suspended on the first side of the bale pressing channel and has a hook for catching the rope materials and providing loops thereof at the first side. The rope diverter is arranged for urging sections of the rope materials between the hook and the rope holder towards the bale pressing channel into positions extending through the knotting area.

13 Claims, 7 Drawing Sheets

(56) References Cited

U.S. PATENT DOCUMENTS

| | | | | |
|---|---|---|---|---|
| 3,667,377 A | * | 6/1972 | Persson | A01F 15/146 100/11 |
| 4,074,623 A | | 2/1978 | White | |
| 4,108,062 A | | 8/1978 | White | |
| 4,459,904 A | * | 7/1984 | Probst | A01F 15/146 100/11 |
| 5,255,597 A | * | 10/1993 | Vos | A01F 15/14 100/17 |
| 6,032,575 A | * | 3/2000 | Johnson | B65B 27/12 100/11 |
| 7,690,402 B2 | | 4/2010 | Legtenberg et al. | |
| 2002/0062744 A1 | | 5/2002 | Telscher | |
| 2004/0148920 A1 | * | 8/2004 | Drost | B65B 13/28 57/22 |
| 2006/0012176 A1 | | 1/2006 | Schoonheere et al. | |
| 2007/0089617 A1 | | 4/2007 | Legtenberg et al. | |

FOREIGN PATENT DOCUMENTS

| | | |
|---|---|---|
| EP | 1 584 227 A1 | 10/2005 |
| GB | 2 184 392 A | 6/1987 |

* cited by examiner

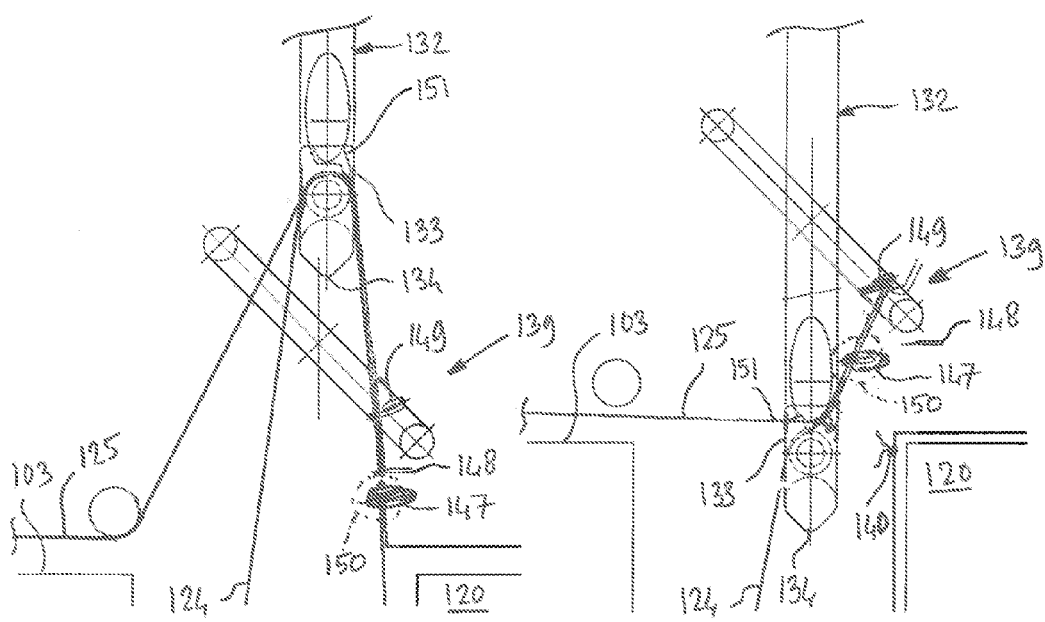
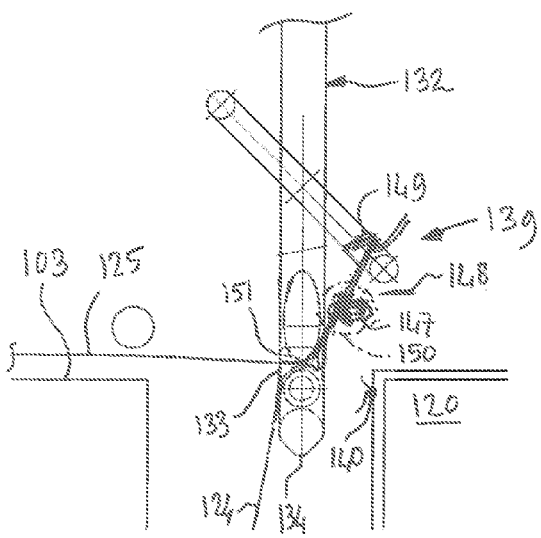

BALING PRESS WITH A ROPE TYING SYSTEM AND METHOD OF SUPPLYING ROPE TO A KNOTTER OF A BALING PRESS

FIELD AND BACKGROUND OF THE INVENTION

The invention relates to a baling press with a rope tying system and to a method of supplying rope to a knotter of a baling press.

Knotting mechanisms for tying a rope around a bale pressed in a baling press have been known for more than a century. Compared with tying bales with steel or plastic wire material, tying bales with rope provides the advantage that a wider range of generally lower cost materials are available and that in rope material is generally more robust in practice, since a smaller reduction of the tensile strength is caused by knots and sharp bends. A particularly well-known knotter is the Appleby knotter, which allows mechanical knotting of twined rope material. Such a knotter is disclosed in U.S. Pat. Nos. 208,137, 591,614 and 744,153. More recent applications of knotters of this type in baling presses are disclosed in German patent specification 27 59 976 and European patent application 1 190 618. Such knotters have been developed for and are widely applied in the field of harvesting machines for tying bales of hay and straw.

In such baling presses, the knotter is arranged at a first side of a bale pressing channel and a first rope material is fed at the first side of the bale pressing channel. A second rope material is fed at the second side of the bale pressing channel opposite of the first side. Each time a bale has been pressed, a loop supply arm is moved from the second side of the bale pressing channel to the first side along a trailing face of the pressed bale and forming and supplying a loop of the second rope material to the first side of the bale pressing channel, where the second rope material and the first rope material are engaged in a knotting area and knotted together by the knotter, thereby closing a loop of the first and the second rope material at the trailing end of the pressed bale. The formed knot is then cut off the more upstream rope material, of which free ends are held at the knotter. The loop supply arm is then retracted and a section of the first rope material is pressed towards a section of the second rope material extending through knotting area, where the first rope material and the second rope material are again engaged in the knotting area and knotted together by the knotter, thereby starting a loop of the first and the second rope material to be formed around the leading end of next bale to be pressed. Thus, sections of the first and the second rope material have to be presented in the knotting area twice, first for forming the knot at the trailing end and subsequently, after the first knot has been cut off from the rope material, for forming the knot at the leading end of the next bale.

The larger a baling press, the more space is required for the loop supply arm at second side of the bale pressing channel and its range of movement. Furthermore, in view of the need of accurately supplying a loop to the knotting area at a side of the bale pressing channel opposite of the side where the loop supply arm is suspended, the loop supply arms need to be of a stiff construction and be manufactured with tight tolerances.

SUMMARY OF THE INVENTION

It is an object of the present invention to provide a more compact solution that allows knotting twined rope material around bales in a baling press.

According to the invention, this object is achieved by providing a baling press with a rope tying system for tying rope around pressed bales. The press includes:
a bale pressing channel;
a ram reciprocally movable in the bale pressing channel for pressing material in the bale pressing channel;
at least one first rope feeding structure for feeding first rope material along a first feeding path on a first side of the bale pressing channel;
at least one second rope feeding structure for feeding second rope material along a second feeding path on a second side of the bale pressing channel opposite of the first side of the bale pressing channel;
for each pair of first and second rope feeding structures:
a knotter on the first side of the bale pressing channel, which knotter includes:
   a knot tier for engaging sections of the first rope material fed along the first feeding path and of the second rope material fed along the second feeding path in a knotting area and knotting the sections to each other;
   a cutter for cutting off rope material from the sections knotted to each other; and
   a rope holder for holding rope material cut off from the knotted rope sections, the knotting area being located closer to the bale pressing channel than the rope holder;
   a loop supply member for forming a loop of the second rope material across the bale pressing channel to the first side of the bale pressing channel and a loop of the first rope material at the first side; and
   a rope diverter.

The loop supply member is suspended on the first side of the bale pressing channel and movable between an extended position in which the loop supply member projects from the first side across the bale pressing channel to the second side of the bale pressing channel and a retracted position on the first side of the bale pressing channel. The loop supply member has a hook adjacent to a free end for catching the second rope material on the second side of the bale pressing channel and for catching the first rope material on the first side of the bale pressing channel. The rope diverter is arranged for urging sections of the first and the second rope materials between the hook and the rope holder towards the bale pressing channel into positions extending through the knotting area.

The invention can also be embodied in a method of supplying rope to a knotter of a baling press with a rope tying system for tying rope around pressed bales, the press comprising at least one knotter on a first side of the bale pressing channel, the knotter including:
   a knot tier for engaging sections of the first and the second rope material in a knotting area and knotting the sections to each other;
   a cutter for cutting off rope material; and
   a rope holder for holding rope material cut off from the knotted rope sections.

The method includes:
feeding at least a first rope material along a first feeding path on a first side of the bale pressing channel;
feeding at least a second rope material along a second feeding path on a second side of the bale pressing channel opposite of the first side of the bale pressing channel;
a loop supply member suspended on the first side of the bale pressing channel extending from a retracted position on the first side of the bale pressing channel to an extended position in which the loop supply member projects from the first side across the bale pressing channel to the second side of the bale pressing channel;

the loop supply member retracting from the extended position to the retracted position, a hook adjacent to a free end of the loop supply member catching the second rope material on the second side of the bale pressing channel and catching the first rope material on the first side of the bale pressing channel, and forming loops of the first and second rope material at the first side of the bale pressing channel;

the knot tier engaging sections of the first and the second rope material in a knotting area and tying a knot knotting a first rope section fed along the first feeding path to a second rope section fed along the second feeding path thereby closing a loop around a pressed bale at the first side of the bale pressing channel adjacent to a trailing end of the bale;

the cutter cutting off the tied knot from more upstream rope material;

the rope holder holding rope material cut off from the knotted rope sections; and a rope diverter urging sections of the first and the second rope materials between the hook and the rope holder towards the bale pressing channel into positions extending through the knotting area.

By suspending the loop supply member at the same side of the baling press as the knotter, a more compact construction is achieved. According to the invention, the problem of bringing sections of the first and the second rope material in the knotting area after the first knot following pressing of a bale has been made and cut off is solved by providing a rope diverter urging sections of both the first and the second rope material between the hook and the rope holder towards the bale pressing channel into positions extending through the knotting area. Thus, no additional rope diverter is needed and the loop supply member does not have to be extended across the bale pressing channel to pull the second rope material to the second side, which would interfere with the pressing of the next bale.

Further features, effects and details of the invention appear from the detailed description and the drawings.

BRIEF DESCRIPTION OF THE DRAWINGS

FIGS. 8-10 are schematic side views at a larger scale of a smaller portion of the baling press according to FIGS. 1-7 in successive stages of operation;

DETAILED DESCRIPTION

Figure 1:
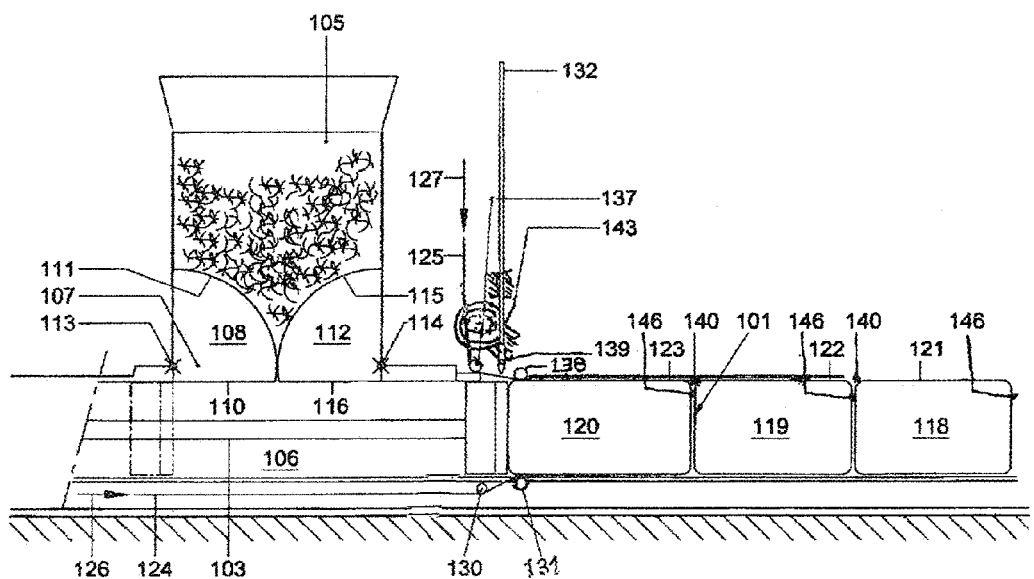
FIG. 1 is a schematic side view of a first example of a baling press according to the invention.

In FIG. 1 an example of a baling press according to the invention is shown. The baling press shown in FIG. 1 has a feed chute 105, which terminates in a bale pressing channel 101. The feed chute 105 is connected with the bale pressing channel 101 via a passage 107. Mounted at the end of the feed chute 105 on the side of the bale pressing channel 101 are a first and a second prepress valve 108 and 112. The prepress valves 108 and 112 are pivotable around axes 113 and 114, respectively, between a closed position (as shown) and an opened position. The prepress valves 108 and 112 are each provided with a surface 111 and 115, respectively, substantially curving with the respective pivotal axes 113, 114, as well as with flat walls 110, 116 which form a part of the wall of the feed chute 105 when in opened position. In closed position the surfaces 110 and 116 close off the feed chute 105 in axial direction.

Under the feed chute 105, a ram 103 is arranged. The ram 103 is reciprocally movable in the bale pressing channel 101 in longitudinal direction of the bale pressing channel 101 between a retracted position upstream of the downstream end opening of the feed chute 105, for receiving material from the feed chute 105 in front of the ram 103, and an extended position in which a compressed bale 120 is delivered in the bale pressing channel 101. In the bale pressing channel 101 a counter pressure is built up by friction of compressed bales along inner surfaces of the bale pressing channel. Pressing a bale may involve one or more reciprocating movements of the ram 103, additional material to be pressed being supplied to the bale pressing channel 101 from the feed chute 105 each time after the ram 103 has been retracted.

The baling press is equipped with a plurality of rope tying systems for tying a corresponding number of mutually parallel loops 121-123 around each of the bales 118-120. Dependent on the width of the bale pressing channel 101, the number of rope tying systems may for instance be four, five or six, but a higher or lower number of parallel rope tying systems may also be provided. The rope tying systems each have a first rope feeding structure for feeding first rope material 125 along a first feeding path 127 on a first side of the bale pressing channel 101 and a second rope feeding structure for feeding second rope material 124 along a second feeding path 126 on a second side of the bale pressing channel 101 opposite of the first side of the bale pressing channel 101. The rope tying systems each have one single knotter 139 at the first side of the bale pressing channel 101. The knotters 139 are arranged next to each other in a row oriented horizontally and transverse to the longitudinal direction of the bale pressing channel 101.

Compared with wire material of similar tensile strength, rope material composed of twisted and/or twined strands is more flexible. This flexibility and capability of accommodating to deformations by redistributing loads over the strands is advantageous for robustness, but makes connecting ends of rope material more difficult than connecting ends of wire material. While ends of wire material can be connected by twisting the ends about each other, connecting rope material without using additional connecting members, such as clamps, requires knotting.

Figure 19:
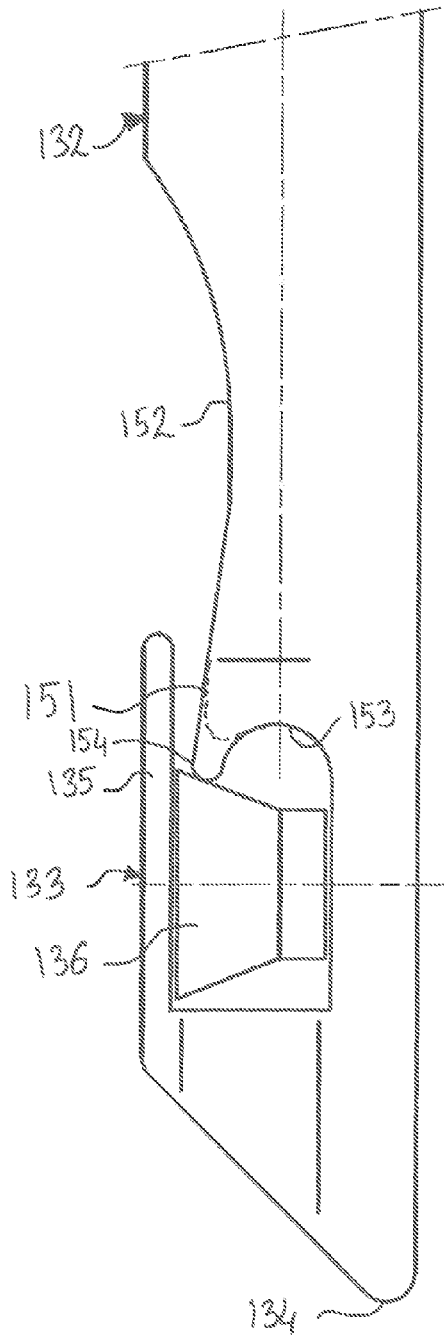
FIG. 19 is a front view of the hook portion shown in FIG. 18.

The loops 121-123 are each formed of the first rope material 125 and the second rope material 124. In this example, the first side of the bale pressing channel 101 is constituted by the top side of the bale pressing channel 101 and the second side is constituted by the bottom side of the bale pressing channel 101. The rope tying arrangements each include lower guide rollers 130, 131 located closely along the bottom of the bale pressing channel 101, for guiding the second rope material 124 fed from respective spools into the bale pressing channel 101 and loop supply members 132 for forming loops of the second rope material 124 across the bale pressing channel 101 to the first side of the bale pressing channel 101 and a loop of the first rope material 125 at the first side by pulling up loops of lower rope material 124 from adjacent to the bottom of the bale pressing channel 101 to the top side of the bale pressing channel 101 and for pulling up loops of first rope material at the top side of the bale pressing channel 101. The loop supply members 132 are suspended on the top side of the bale pressing channel 101 and provided in the form of loop supply rods 132. The loop supply rods 132 are each movable between an extended, lowermost position (not shown) extending from the top side across the bale pressing channel 101 to the lower side of the bale pressing channel 101 for catching the second rope material 124 closely under the bale pressing channel 101 and a retracted, uppermost position on the top side of the bale pressing channel 101 as shown. The loop supply rods 132 each have a hook 133 (see FIGS. 8-10 and FIGS. 18 and 19) adjacent to a free end 134 for catching the second rope material 124 on the bottom side of the bale pressing channel 101 and for catching the first rope material 125 on the first side of the bale pressing channel 101. As is best seen in FIG. 19, the hook 133 is composed of a catching flange 135 and a sheave 136 rotatably suspended between the catching flange 136 and a body portion of the loop supply rod 132 for rotation about an axis transverse to the longitudinal direction in which the loop supply rod 132 is most elongate.

Each time after a bale has been pushed out of the pressing chamber 106, the loop supply rods 132 are lowered through slots in the pressing ram 103, catch the lower ropes of the second rope material 124 that extend closely along the bottom of the bale pressing channel and pull up the ropes 124, thereby forming a temporary loop until above the bale pressing channel 101. During upward movement, the catcher 132 also entrains the upper ropes 125 into temporary loops so that the temporary loops of upper and lower rope material 124, 125 extend through knotting areas of the knotters 139.

The rope tying systems furthermore include upper guide rollers 137, 138 at the top side of the bale pressing channel 101, for guiding upper ropes 125 fed from respective spools into the bale pressing channel 101 and to the area where the temporary loops are formed.

The knotters 139 are each positioned and arranged for engaging first and second rope material 124, 125 in a knotting area of the respective knotter 139. In operation, each time after a bale has been pressed, first a knot 140 is tied adjacent to a trailing end of the pressed bale, cut off from first and second rope material training the knot 140. Subsequently, a next knot 146 tying the first and second rope material 124, 125 to each other is knotted and is pulled taut so that it ends up at the top or front of a next bale that is pressed.

As is schematically illustrated in FIGS. 2-10, the knotters 139 each have a knot tier 147, a cutter 148 and a rope holder 149. The knot tier 147, in the present example in the form of a rotatable knotter hook with a beak, is arranged for engaging sections of the first rope material 125 fed along the first feeding path 127 and of the second rope material 124 fed along the second feeding path 126 in a knotting area 150 (see FIGS. 8-10) and knotting these sections to each other to form a knot 140 or 146. The cutter 148 is arranged for cutting off rope material 124, 125 from the sections of that material 124, 125 knotted to each other. The rope holder 148, in the present example a beak on an arm, is arranged for holding rope material 124, 125 cut off from the knotted rope sections. The knotting area 150 is located closer to the bale pressing channel than the rope holder 149. The knotters 139 may for instance be of the Appleby type, such knotters are commercially available from for instance Rasspe Systemtechnik GmbH & Co. KG. Wermelskirchen, Germany.

In the present example, the loop supply rods 132 are each equipped with a rope diverter 151. The rope diverter 151 is shown in more detail in FIGS. 18 and 19. The rope diverter 151 is arranged for urging sections of the first and the second rope material between the hook 133 and the rope holder 149 towards the bale pressing channel 101 into closely adjacent positions extending through the knotting area 150. This allows a further section of the first and the second rope material 124, 125 to be brought in a position extending through the knotting area 150 after the first knot 140 closing a loop 123 about a pressed bale 210 has been made, so that the knotter 147 can engage the further section of the first and the second rope material 124, 125 for making the first knot 146 for a loop to be formed about a next bale to be pressed. Because the further section of the first and the second rope material 124, 125 between the hook 133 and the rope holder 149 are urged towards the bale pressing channel 101, also the second rope material 125 can be brought in a position extending through the knotting area 150 without retracting the loop supply rod 132 back to the bottom side of the bale pressing channel 101, as is required in prior art baling presses with knotters.

Successive steps of operation of a baling press according to the present example are described below with reference to FIGS. 2-10.

Figure 2:
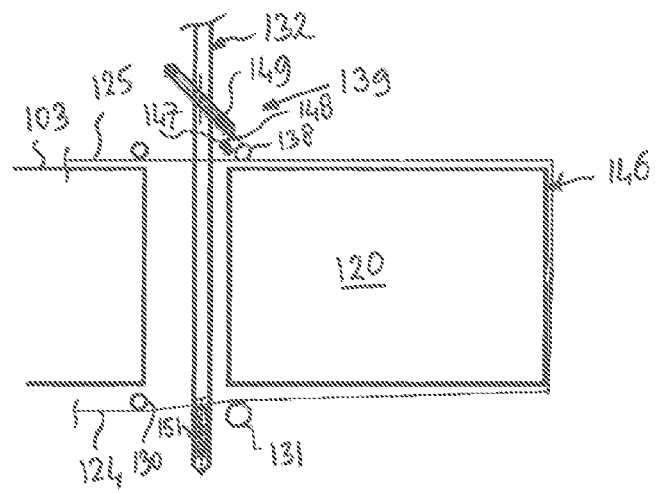
FIGS. 2-7 are schematic side views of a portion of a the baling press according to FIG. 1 in successive stages of operation.

In FIG. 2, the baling press is shown in a stage of operation in which a bale 120 has been pressed and the loop supply rod 132 has been extended (in practice through slots in the ram 103) from the position shown in FIG. 1 to a position in which the hook 133 is just below the second rope 124. Because the tensioning axis of the rope 124 substantially intersects the center line of the loop supply rod 132, the rope 124 will be resting against a recess 152 (see FIGS. 18 and 19) in a side of the loop supply rod 132 facing the rope 124. By feeding the first rope material 125 along the first feeding path 127 and feeding the second rope material 124 along the second feeding path 126 a loop of rope material has been formed around the pressed bale 120. The loop has a knot at a leading end of the bale 120, but is still to be closed.

Figure 3:
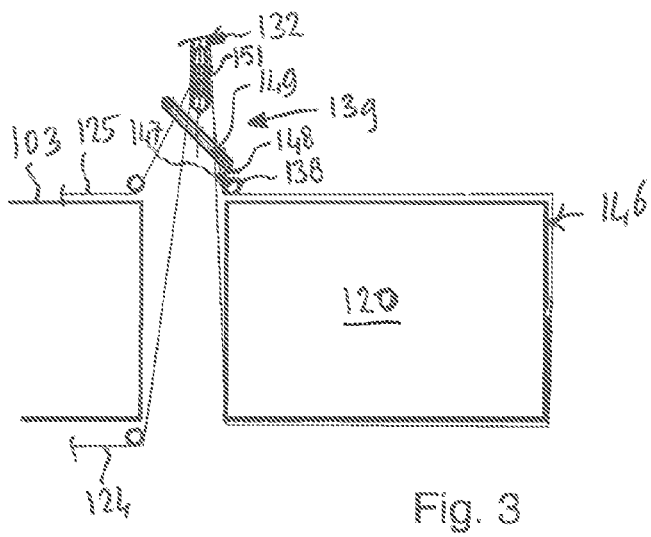

The loop supply rod 132 is then retracted from the extended position to the retracted position shown in FIG. 3. As the loop supply rod 132 is retracted, the hook 133 catches the second rope material 124, because the rope 124 slides along the surface of the recess 152 to a position caught by the hook 133. As the hook 133 reaches the first rope 125, also that rope 125, which is tensioned so that it is pressed against the side of the loop supply rod 132 in which the recess 152 has been provided, slides along the recess 152 and is caught by the hook 133. As the loop supply rod 132 is retracted further, loops of the first and second rope material 124 at the top side of the bale pressing channel 101 are formed. Both of these loops extend through the same hook 133. Then, the knot tier 147 engages sections of the first and the second rope material 124, 125 in the knotting area 150 and ties a knot 140 knotting the first rope 125 to the second rope 124, thereby closing the loop 123 around the pressed bale 120 at the first side of the bale pressing channel 101 adjacent to the trailing end of that bale 120.

Figure 4:
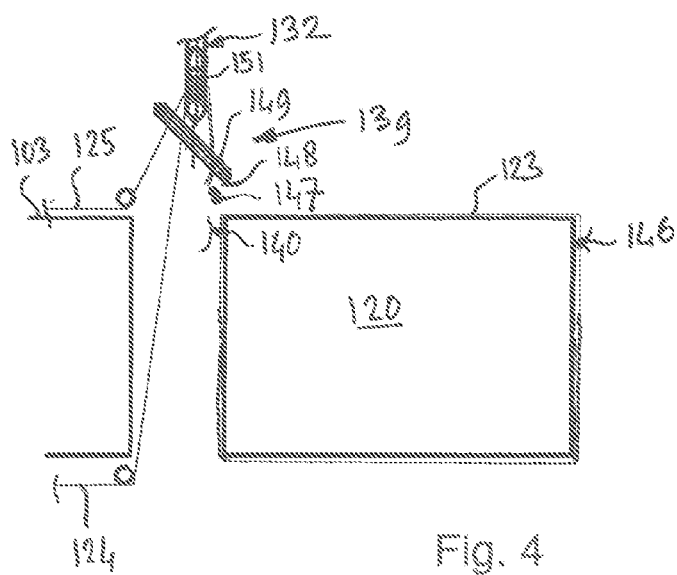

Next, the cutter 148 cuts off the tied knot 140 from more upstream rope material 124, 125, so that a situation as shown in FIG. 4 is reached. This situation is shown in more detail in FIG. 8 (but prior to the knot 140 being released by the knotter hook 147). Meanwhile, the rope holder 149 holds rope material 124, 125 cut off from the knotted rope sections, so that these free rope ends are prevented from slipping out of the hook 133.

Figure 5:
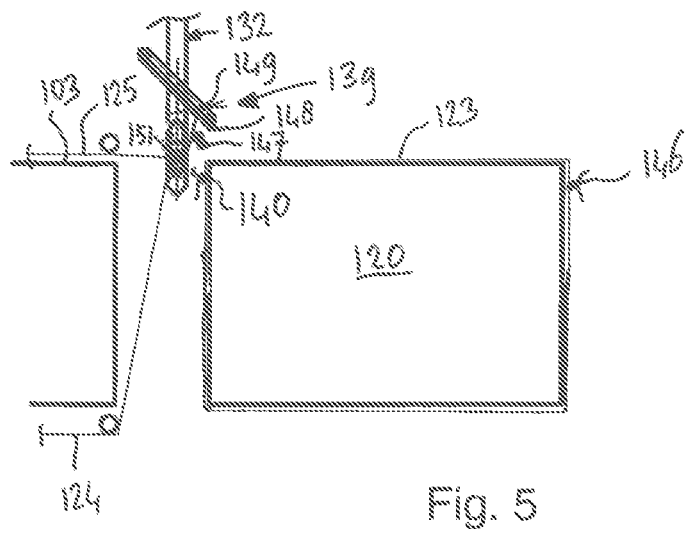
Figure 6:
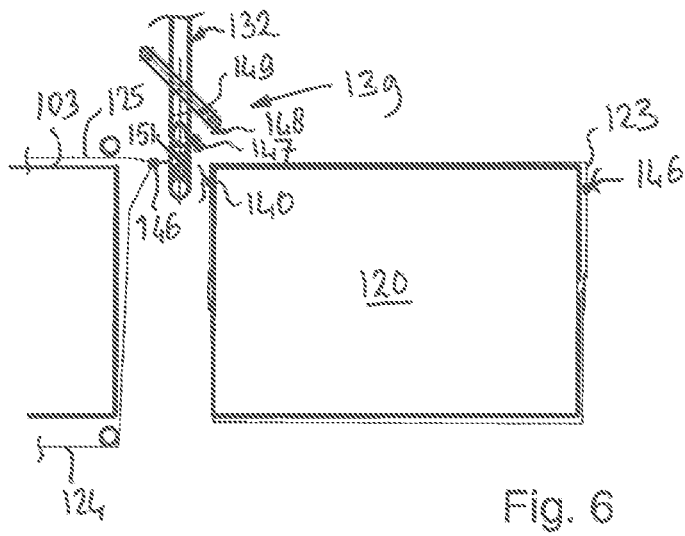

Then, as shown in FIGS. 5 and 9, the rope diverter 151 is moved towards the bale pressing channel 101 and thereby urges sections of the first and the second rope material 124, 125 between the hook 133 and the rope holder 149 towards the bale pressing channel 101 into a position extending through the knotting area 150, where the knot tier 147 engages the first and second sections 124, 125 and makes the next knot 146 (FIG. 10). Thus, the rope material 124, 125 has also been supplied for making the next knot 146, but without requiring the loop supply member 132 to be passed to the bottom side of the bale pressing channel 101 again, so that a loop supply member 132 suspended at the same side of the bale pressing channel 101 as the knotter 139 can be used.

Figure 7:
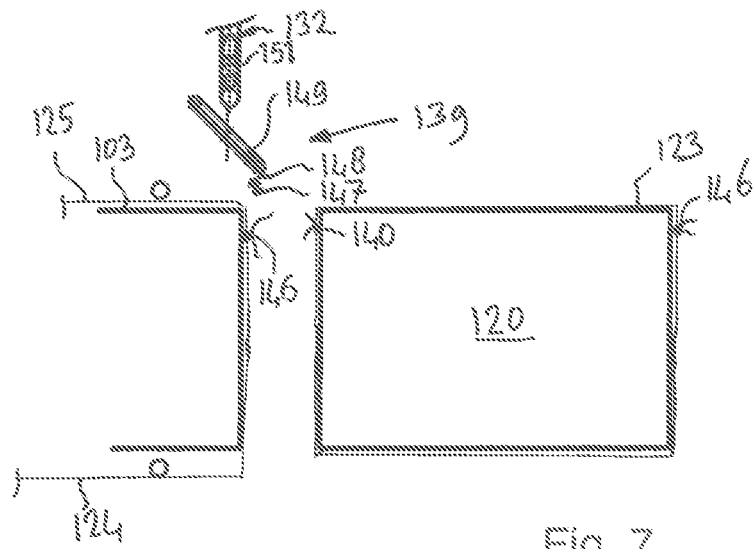

After the next knot 146 has been made, the rope holder 149 releases the rope material 124, 125 (FIG. 6) so that these free rope ends, which have now been knotted to each other at knot 146 are allowed to slip out of the hook. The first and second ropes 124, 125 are then pulled taut so that the second knot 146 reaches a position in front of the ram 103 (FIG. 7). After the ram 103 has retracted and pressed a next bale, the knot 146 will be positioned at a leading face of that bale.

In the baling press according to the present example, the rope diverter 151 is fixed relative to the hook 133 and has a guide surface 153 (see FIGS. 18 and 19) facing the bale pressing channel 101. This provides the advantage that the rope diverter 151 moves together with the hook 133 and accordingly with the loop supply member 132. Diverting the first and second rope material sections between the hook 133 and the rope holder 149 to the knotting area is achieved by moving the loop supply member 132 towards the bale pressing channel 101 over a short distance. Thus, no separate drive for driving movement of the rope diverter 151 is needed and both the first and second rope material sections to be knotted brought in the knotting area by a small additional movement of the loop supply member 132.

For reliably urging the first and second rope material sections to be knotted to the knotting area 150 and avoiding escaping of one or both ropes, the guide surface 153 is formed as a slot in longitudinal direction of the bale pressing channel 101 and having an open side facing the bale pressing channel 101 and an inner surface of the hook 133.

The rope diverter 151 has a finger shaped protrusion 154 projecting towards the bale pressing channel 101 on a side of the hook 133 facing the knotting area 150. Because this protrusion 154 projecting towards the bale pressing channel 101 on a side of the hook 133, it does not hinder rope material entering the hook 133, since the rope material assumes a curved shape over the inner surface of the hook (in this example the sheave 136), so it stays substantially clear from the protrusion. However, when the rope material is urged to the knotting area 150, the curvature of the rope material through the hook 133 is inverted in the area of the protrusion 154, so the protrusion 154 forms a blockade that effectively prevents the rope material from slipping off the rope diverter 151.

It is further noted that, because the loop supply members 132 are in the form of rods reciprocally movable in longitudinal direction of the rods, the loop supply member 132 can be moved to and fro through a very small corridor. This is of particular advantage in the area of the knotters 139 where little space is available. For compactness of the corridors required for passing through the bale pressing channel 101, it is a further advantage that the rods 132 are straight.

In relation to the pressing direction of the pressing ram 103, the knotting areas 150 are located on a downstream side of the loop supply rods 132, which reduces the risk of the entangling of the knotted rope material 124, 125 with the loop supply rods 132.

Because the first side is a top side of the bale pressing channel 101, the knotters 139 and the retracted loop supply members 132 are located on top of the bale pressing channel 101. This is of particular advantage for providing a baling press with a small foot print and or with the bale pressing channel 101 close to the floor. Also safety risks associated with loop supply members 132 making large movements through areas easily accessible by staff are avoided.

In FIGS. 11-17 successive stage of operation of a second example of a baling press according to the invention is shown. The baling press according to this example has a bale pressing channel 201. A pressing ram 203 is reciprocally movable in the bale pressing channel 201 in longitudinal direction of the bale pressing channel 201.

The baling press is equipped with a plurality of rope tying systems for tying a corresponding number of mutually parallel loops around each of the bales 220. The rope tying systems each have a first rope feeding structure for feeding first rope material 225 along an upper feeding path on a top side of the bale pressing channel 201 and a lower rope feeding structure for feeding second rope material 224 along a lower feeding path 126 on a bottom side of the bale pressing channel 201. The rope tying systems each have one knotter 239 at the first side of the bale pressing channel 201.

The loops are each formed of the first rope material 225 and the second rope material 224. The rope tying arrangements each include loop supply members 232 for forming loops of the second rope material 224 across the bale pressing channel 201 to the first side of the bale pressing channel 201 and a loop of the first rope material 225 at the first side. The loop supply members 232 are suspended on the top side of the bale pressing channel 201 and provided in the form of loop supply rods 232. The loop supply rods 232 are each movable between an extended, lowermost position (FIG. 11) extending from the top side across the bale pressing channel 201 to the lower side of the bale pressing channel 201 for catching the second rope material 224 closely under the bale pressing channel 201 and a retracted, uppermost position on the top side of the bale pressing channel 201 as shown in FIGS. 12-17. The loop supply rods 232 each have a hook 233 adjacent to a free end for catching the second rope material 224 on the bottom side of the bale pressing channel 201 and for catching the first rope material 225 on the top side of the bale pressing channel 201.

Each time after a bale has been pushed out of the pressing chamber 206, the loop supply rods 232 are lowered through slots in the pressing ram 203, catch the lower ropes of the second rope material 224 and pull up the ropes 224, thereby forming a temporary loop until above the bale pressing channel 201. During upward movement, the catcher 232 also entrains the upper ropes 225 into temporary loops so that the temporary loops of upper and lower rope material 224, 225 extend through knotting areas of the knotters 239.

The knotters 239 each have a knot tier 247, a cutter 248 and a rope holder 249. The knot tier 247, in the present example in the form of a rotatable knotter hook with a beak, is arranged for engaging sections of the first and second rope materials 224, 225 in a knotting area at the knot tier 247 and knotting these sections to each other to form a knot 240 or 246. The cutter 248 is arranged for cutting off rope material 224, 225 from sections of that material 224, 225 that have been knotted to each other. The rope holder 248, in the present example a beak on an arm, is arranged for holding rope material 224, 225 cut off from the knotted rope sections. The knotting area is located closer to the bale pressing channel than the rope holder 249. Also these knotters 239 may for instance be of the Appleby type, which knotters are commercially available from for instance Rasspe Systemtechnik GmbH & Co. KG, Wermelskirchen, Germany.

In the present example, the loop rope diverter 251 is in the form of a rope presser 251 for pressing loops 255, 256 of the first and the second rope material 224, 225 between the hook 233 and the rope holder 249 towards the bale pressing channel 201 with sections of the rope material on one side of the loop extending through the knotting area.

Figure 14:
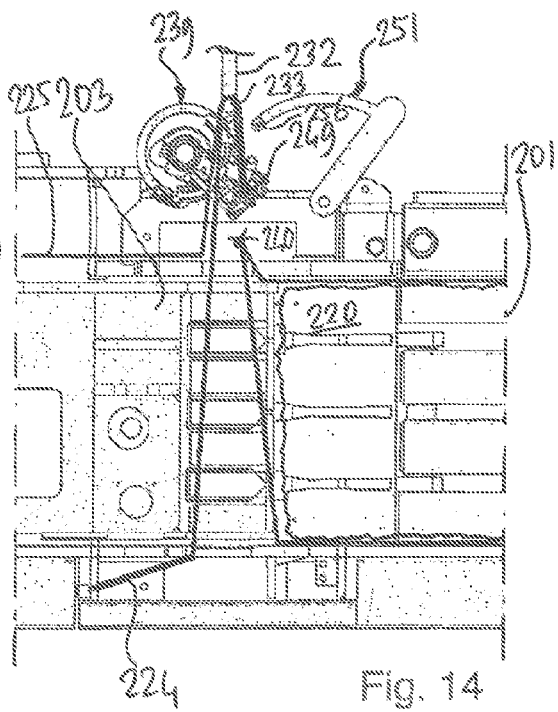
Figure 15:
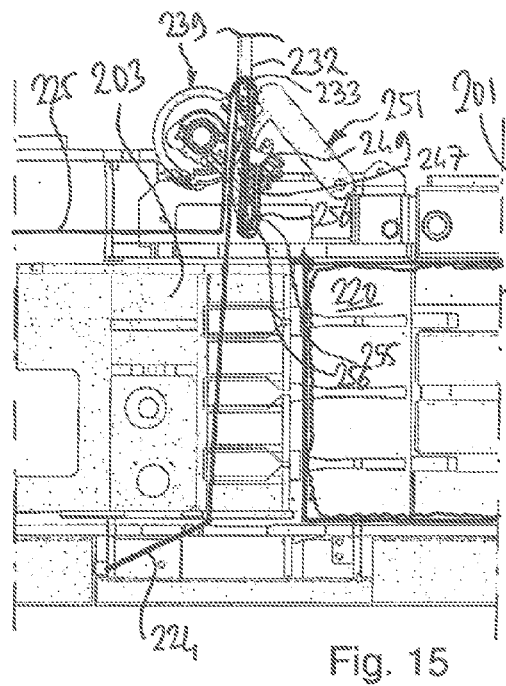
Figure 16:
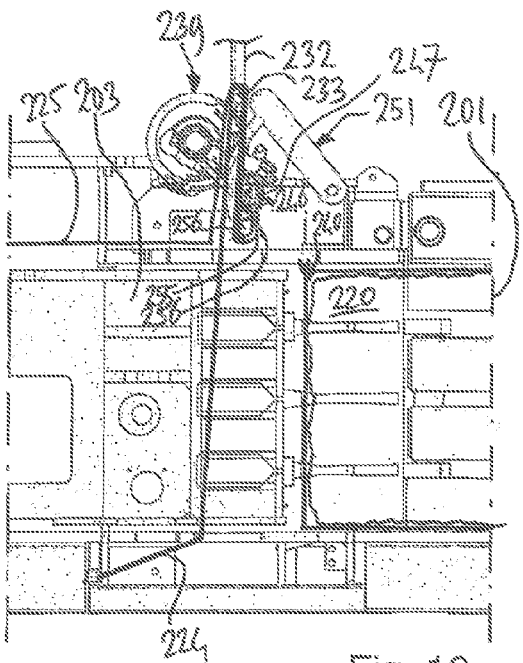
Figure 17:
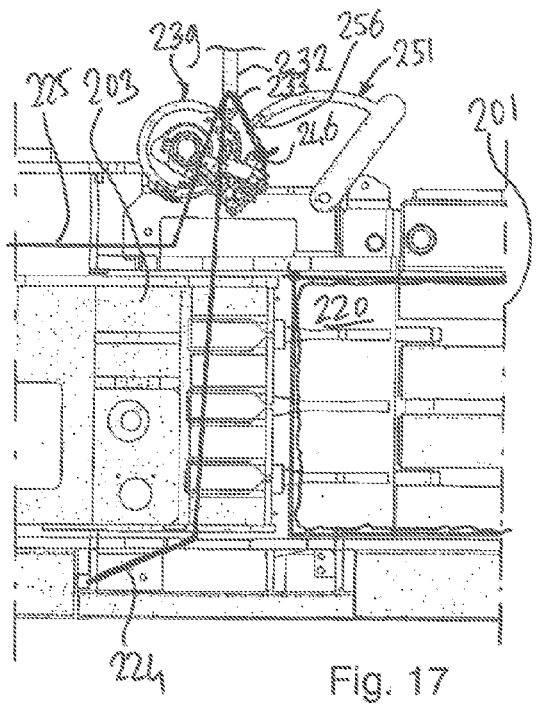
Figure 18:
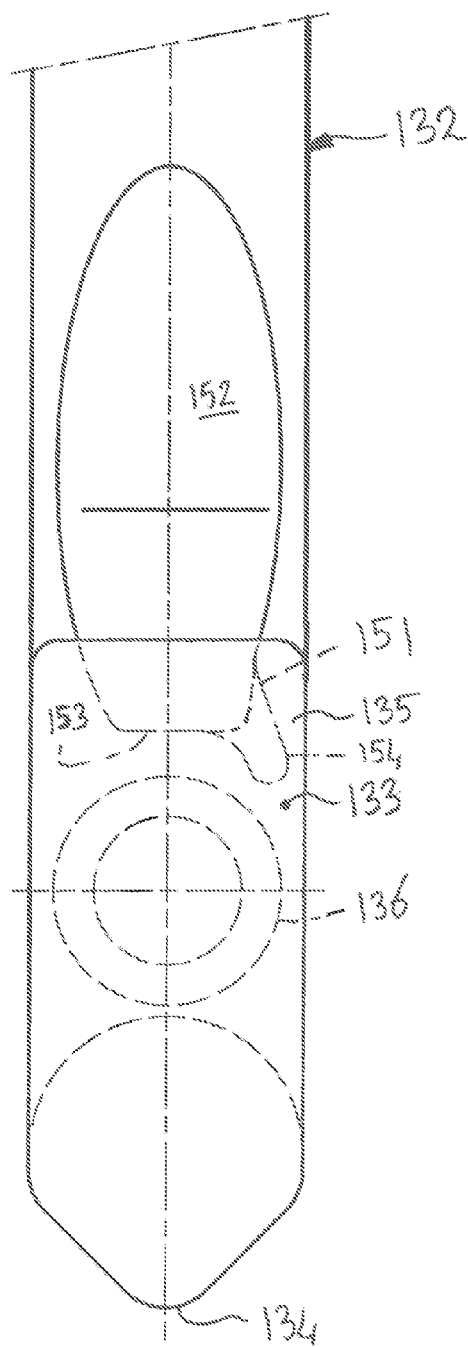
FIG. 18 is a side view of an example of a hook portion of a loop supply member of the baling press according to FIGS. 1-10.

The rope diverter 252 is reciprocally movable along a path between a retracted position (FIGS. 11-14 and 17) and a rope pressing position (FIGS. 15 and 16). The path has a directional component in a direction parallel to the bale pressing channel, so that the rope sections to be urged toward the bale pressing channel 101 are reliably engaged. This can also be achieved by providing a directional component tangentially to the bale pressing channel.

Successive steps of operation of a baling press according to the second example are described below with reference to FIGS. 11-17.

Figure 11:
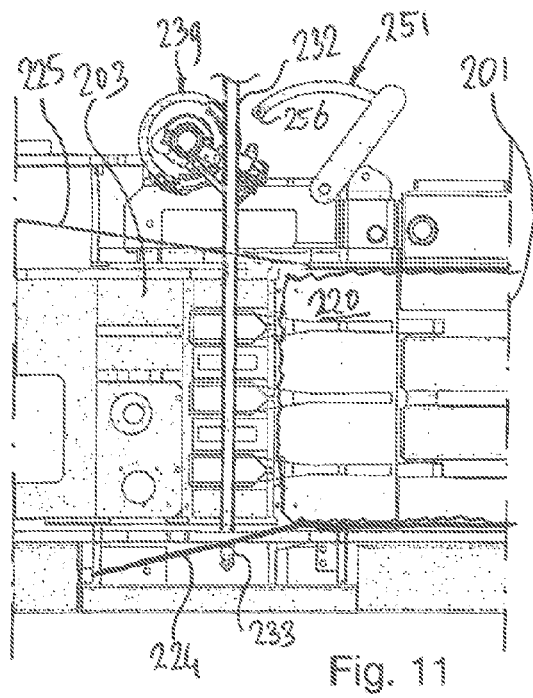
FIGS. 11-17 are schematic side views of a portion of a third example of a baling press according to the invention in successive stages of operation.
Figure 12:
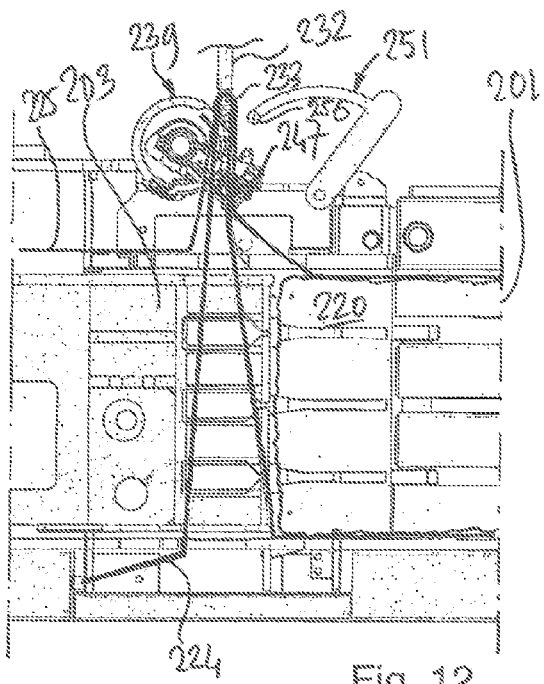

In FIG. 11, the baling press is shown in a stage of operation in which a bale 220 has been pressed and the loop supply rod 232 has been extended through slots in the ram 203 to a position in which the hook 233 is just below the second rope 224. The rope 224 is tensioned so that it rests against a side of the loop supply rod 232 facing the rope 224 and to which side the hook 233 is open. The loop supply rod 232 is then retracted from the extended position to the retracted position shown in FIG. 12. As the loop supply rod 232 is retracted, the hook 233 catches the second rope material 224, because the rope 224 slides along the rod 232 until it is caught by the hook 233. As the hook 233 reaches the first rope 225, also that rope 225, which is tensioned so that it is pressed against the side of the loop supply rod 232 to which the hook 233 is open, is caught by the hook 233. As the loop supply rod 232 is retracted further, loops of the first and second rope material 224 at the top side of the bale pressing channel 201 are formed. Both of these loops extend through the same hook 233. Then, the knot tier 247 engages sections of the first and the second rope material 124, 125 in the knotting area and ties a knot 240 knotting the first rope 225 to the second rope 224, thereby closing the loop around the pressed bale 220 at the top side of the bale pressing channel 201 adjacent to the trailing end of that bale 220.

Figure 13:
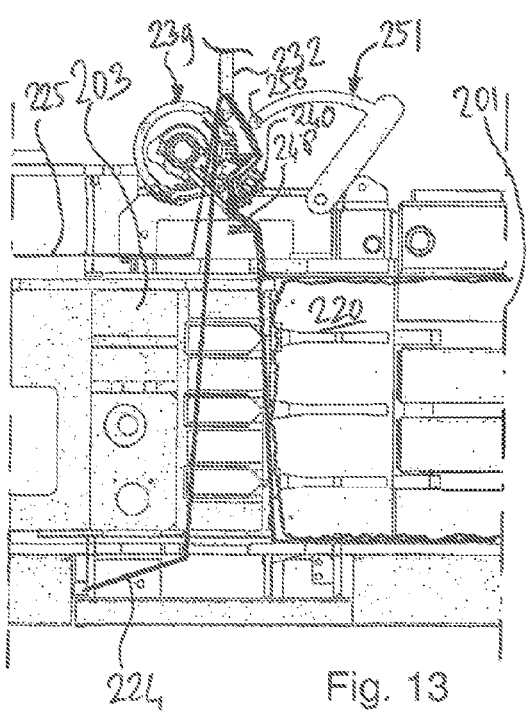

Next, as shown in FIG. 13, the cutter 248 cuts off the tied knot 240 from more upstream rope material 224, 225, so that a situation as shown in FIG. 14 is reached. Meanwhile, the rope holder 249 holds rope material 224, 225 cut off from the knotted rope sections, so that these free rope ends are prevented from slipping out of the hook 233.

Then, as shown in FIG. 15, a diverter sheave 256 of the rope diverter 251 is moved towards the bale pressing channel 201 and thereby urges sections of the first and the second rope material 224, 225 between the hook 233 and the rope holder 249 towards the bale pressing channel 201, forming loops 255, 256 of the first and second rope materials, of which loops 255, 256 one side extends through the knotting area. Then, the knot tier 247 engages the first and second sections 224, 225 and makes the next knot 246 (FIG. 16). Thus, the rope material 224, 225 has also been supplied for making the next knot 246 without requiring the loop supply member 232 to be passed to the bottom side of the bale pressing channel 201, so that a loop supply member 232 suspended at the same side of the bale pressing channel 201 as the knotter 239 can be used.

After the next knot 246 has been made, the rope diverter 251 is retracted before rope holder 249 releases the rope material 224, 225 (FIG. 17) so that less slack has to be pulled out of the rope material after the rope holder 249 has released these free rope ends, which have now been knotted to each other at knot 146. Thus the risk of entangling of rope material is reduced. The first and second ropes 224, 225 are then pulled taut so that the second knot 246 reaches a position in front of the ram 203. After the ram 203 has retracted and pressed a next bale, the knot 246 will be positioned at a leading face of that bale.

Several features have been described as part of the same or separate embodiments. However, it will be appreciated that the scope of the invention also includes embodiments having combinations of all or some of these features other than the specific combinations of features embodied in the examples.

The invention claimed is:

1. A baling press with a rope tying system for tying rope around pressed bales, the press comprising:
    a bale pressing channel;
    a ram reciprocally movable in the bale pressing channel for pressing material in the bale pressing channel;
    at least one first rope feeding structure for feeding first rope material along a first feeding path on a first side of the bale pressing channel;
    at least one second rope feeding structure for feeding second rope material along a second feeding path on a second side of the bale pressing channel opposite of said first side of the bale pressing channel;
    for each pair of first and second rope feeding structures:
    a knotter on said first side of the bale pressing channel, said knotter comprising:
        a knot tier for engaging sections of the first rope material fed along said first feeding path and of the second rope material fed along said second feeding path in a knotting area and knotting said sections to each other;
        a cutter for cutting off rope material from said sections knotted to each other; and
        a rope holder for holding rope material cut off from the knotted rope sections, the knotting area being located closer to the bale pressing channel than the rope holder;
    a loop supply member for forming a loop of the second rope material across the bale pressing channel to said first side of said bale pressing channel and a loop of the first rope material at said first side; and
    a rope diverter;
    wherein said loop supply member is suspended on said first side of said bale pressing channel and movable between an extended position in which the loop supply member projects from said first side across said bale pressing channel to said second side of said bale pressing channel and a retracted position on said first side of said bale pressing channel;
    wherein said loop supply member has a hook adjacent to a free end for catching said second rope material on said second side of said bale pressing channel and for catching said first rope material on said first side of said bale pressing channel; and
    wherein the rope diverter is arranged for urging sections of the first and the second rope materials between the hook and the rope holder towards the bale pressing channel into positions extending through the knotting area.

2. A baling press according to claim 1, wherein the rope diverter is fixed relative to the hook and has a guide surface facing the bale pressing channel.

3. A baling press according to claim 2, wherein the guide surface is formed as a slot in longitudinal direction of the bale pressing channel and having an open side facing the bale pressing channel.

4. A baling press according to claim 2, wherein the guide surface is formed as a slot in longitudinal direction of the bale pressing channel and having an open side facing an inner surface of the hook.

5. A baling press according to claim 2, wherein the rope diverter comprises a protrusion projecting towards the bale pressing channel on a side of the hook facing the knotting area.

6. A baling press according to claim 1, wherein said rope diverter is in the form of a rope presser for pressing loops of the first and the second rope material between the hook and the rope holder towards the bale pressing channel with sections of the rope material on one side of the loop extending through the knotting area.

7. A baling press according to claim 6, wherein said rope diverter is reciprocally movable along a path between a retracted position and a rope pressing position, said path having a directional component in a direction parallel to the bale pressing channel and/or tangentially to the bale pressing channel.

8. A baling press according to claim 1, wherein the loop supply member is in the form of a rod reciprocally movable in longitudinal direction of said rod.

9. A baling press according to claim 1, wherein pressing ram is arranged for pressing in a downstream direction and wherein the knotting area is located on a downstream side of said loop supply member.

10. A baling press according to claim 1, wherein said first side is a top side of said bale pressing channel.

11. A method of supplying rope to a knotter of a baling press with a rope tying system for tying rope around pressed bales, the press comprising at least one knotter on a first side of the bale pressing channel, said knotter comprising:
    a knot tier for engaging sections of the first and the second rope material in a knotting area and knotting said sections to each other;
    a cutter for cutting off rope material; and
    a rope holder for holding rope material cut off from the knotted rope sections;
the method comprising:
    feeding at least a first rope material along a first feeding path on a first side of the bale pressing channel;
    feeding at least a second rope material along a second feeding path on a second side of the bale pressing channel opposite of said first side of the bale pressing channel;
    a loop supply member suspended on said first side of said bale pressing channel extending from a retracted position on said first side of said bale pressing channel to an extended position in which the loop supply member projects from said first side across said bale pressing channel to said second side of said bale pressing channel;
    the loop supply member retracting from the extended position to the retracted position, a hook adjacent to a free end of the loop supply member catching said second rope material on said second side of said bale pressing channel and catching said first rope material on said first side of said bale pressing channel, and forming loops of the first and second rope material at said first side of said bale pressing channel;
    the knot tier engaging sections of the first and the second rope material in a knotting area and tying a knot knotting a first rope section fed along said first feeding path to a second rope section fed along said second feeding path thereby closing a loop around a pressed bale at said first side of said bale pressing channel adjacent to a trailing end of said bale;
    the cutter cutting off the tied knot from more upstream rope material;
    the rope holder holding rope material cut off from the knotted rope sections; and
    a rope diverter urging sections of the first and the second rope materials between the hook and the rope holder towards the bale pressing channel into positions extending through the knotting area.

12. A method according to claim 11, wherein the urging of the sections of the first and the second rope material between the hook and the rope holder towards the bale pressing channel into a position extending through the knotting area is carried out by moving the loop supply member towards the bale pressing channel.

13. A method according to claim 11, wherein the urging of the sections of the first and the second rope material between the hook and the rope holder towards the bale pressing channel into a position extending through the knotting area is carried out by a rope pressing member pressing loops of said sections of the first and the second rope material between the hook and the rope holder towards the bale pressing channel until the rope material on one side of said loops extends through the knotting area.

* * * * *